US011514394B1

(12) United States Patent
Lundeen et al.

(10) Patent No.: US 11,514,394 B1
(45) Date of Patent: Nov. 29, 2022

(54) PACKAGE SORTING PLATFORM SENSORY SYSTEM

(71) Applicant: Ford Global Technologies, LLC, Dearborn, MI (US)

(72) Inventors: Kurt Michael Lundeen, Wixom, MI (US); Timothy Mark Feldkamp, Ann Arbor, MI (US); Justen Fry, Dearborn, MI (US); John Vincent, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/323,801

(22) Filed: May 18, 2021

(51) Int. Cl.
*G06Q 10/08* (2012.01)
*B60P 1/64* (2006.01)
*G06V 20/59* (2022.01)

(52) U.S. Cl.
CPC ........ *G06Q 10/0836* (2013.01); *B60P 1/6409* (2013.01); *G06Q 10/0832* (2013.01); *G06Q 10/0833* (2013.01); *G06V 20/59* (2022.01)

(58) Field of Classification Search
CPC ........... G06Q 10/0836; G06Q 10/0832; G06Q 10/0833; G06V 20/59; B60P 1/6409
See application file for complete search history.

(56) References Cited

U.S. PATENT DOCUMENTS

| 10,139,495 | B2 | 11/2018 | Payne |
| 10,192,194 | B2 | 1/2019 | Bernhardt et al. |
| 2009/0099943 | A1 | 4/2009 | Bodin et al. |
| 2014/0288578 | A1* | 9/2014 | Solar ................ A61B 17/00234 606/130 |
| 2014/0379123 | A1* | 12/2014 | Hirshbain ............... G07F 9/001 700/243 |
| 2016/0239790 | A1* | 8/2016 | Burch, V ............. G06Q 10/083 |
| 2017/0108577 | A1* | 4/2017 | Loverich ............... G01S 5/0284 |
| 2017/0316701 | A1* | 11/2017 | Gil ........................ B64D 45/04 |
| 2020/0094414 | A1* | 3/2020 | Xi ........................... G06V 10/22 |
| 2020/0207250 | A1* | 7/2020 | Jarvis ................. G01C 21/3623 |

(Continued)

OTHER PUBLICATIONS

Jongdae Baek, Two-Dimensional LiDAR Sensor-Based Three-Dimensional Point Cloud Modeling Method for Identification of Anomalies inside Tube Structures for Future Hypersonic Transportation, 2020, p. 1-3 (Year: 2020).*

(Continued)

*Primary Examiner* — Resha Desai
*Assistant Examiner* — Ibrahim N El-Bathy
(74) *Attorney, Agent, or Firm* — Brandon Hicks; Eversheds Sutherland (US) LLP

(57) ABSTRACT

A method for controlling a package delivery sorting system onboard a vehicle includes loading, onboard a package sorting platform, a first package comprising a first fiducial marker, the package sorting platform disposed in a cargo hold of the package delivery vehicle, determining, via a processor, a package identity based on the first fiducial marker, determining, via the processor and based on the fiducial marker, a first package pose comprising a first package position and a first package orientation with respect to the package sorting platform, defining, via the processor, a first package geometry associated with the first package, and causing the sorting platform to position the first package, via the processor, to a second first package pose.

15 Claims, 6 Drawing Sheets

(56) References Cited

U.S. PATENT DOCUMENTS

2020/0380746 A1* 12/2020 Natesan .................. G06T 17/10
2021/0125414 A1* 4/2021 Berkebile ............... G06T 17/20
2022/0138885 A1* 5/2022 Freeman ................ G06Q 50/28
235/384

OTHER PUBLICATIONS

Ravindranadh et al., "Smart Shelves", SciTech Patent Art, ISO 27001, www.info@patent-art.com, 2020, 13 pages.
Ho-Min Park et al, "Box-Scan: An Efficient and Effective Algorithm for Box Dimension Measurement in Conveyor Systems using a Single RGB-D Camera", Research Gate, The 7th International Conference on Industrial Application Engineering, Kitakyushu, Japan, Apr. 2019, 8 pages.

* cited by examiner

PACKAGE SORTING PLATFORM SENSORY SYSTEM

BACKGROUND

E-commerce is growing to unprecedented levels as the means by which everyday consumers purchase goods. Last-mile delivery currently accounts for 53% of shipping expenses. One area of focus for innovation includes automated systems for package handling during the final portion of the delivery cycle.

Controlling position of the package onboard a vehicle can help to optimize the positioning and management of packages during the final delivery that place the right packages in a favorable position onboard the delivery vehicle at the right time. One conventional method for managing position and orientation includes controlling a bed of rollers inside the package delivery vehicle using an onboard computer system. The computer determines which rollers to turn on in order to move items around inside the delivery vehicle to the desired locations for storage or to be picked up by a person. Such a conventional system may include the ability to move packages around for pick up at the exterior-facing door(s) based on delivery schedule or the GPS location of the vehicle.

State of the art package sorting systems may not determine package position and orientation information, and determine package geometry information, or provide package identity while loading respective packages onboard the vehicle for final delivery. In an open-loop motion control scheme, pose estimates can be inferred from motion commands, but if slip occurs or if a package shifts during transit, error will accumulate between the package's estimated pose and actual pose. The more a package is moved and the longer it remains in transit, the larger the error will grow.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
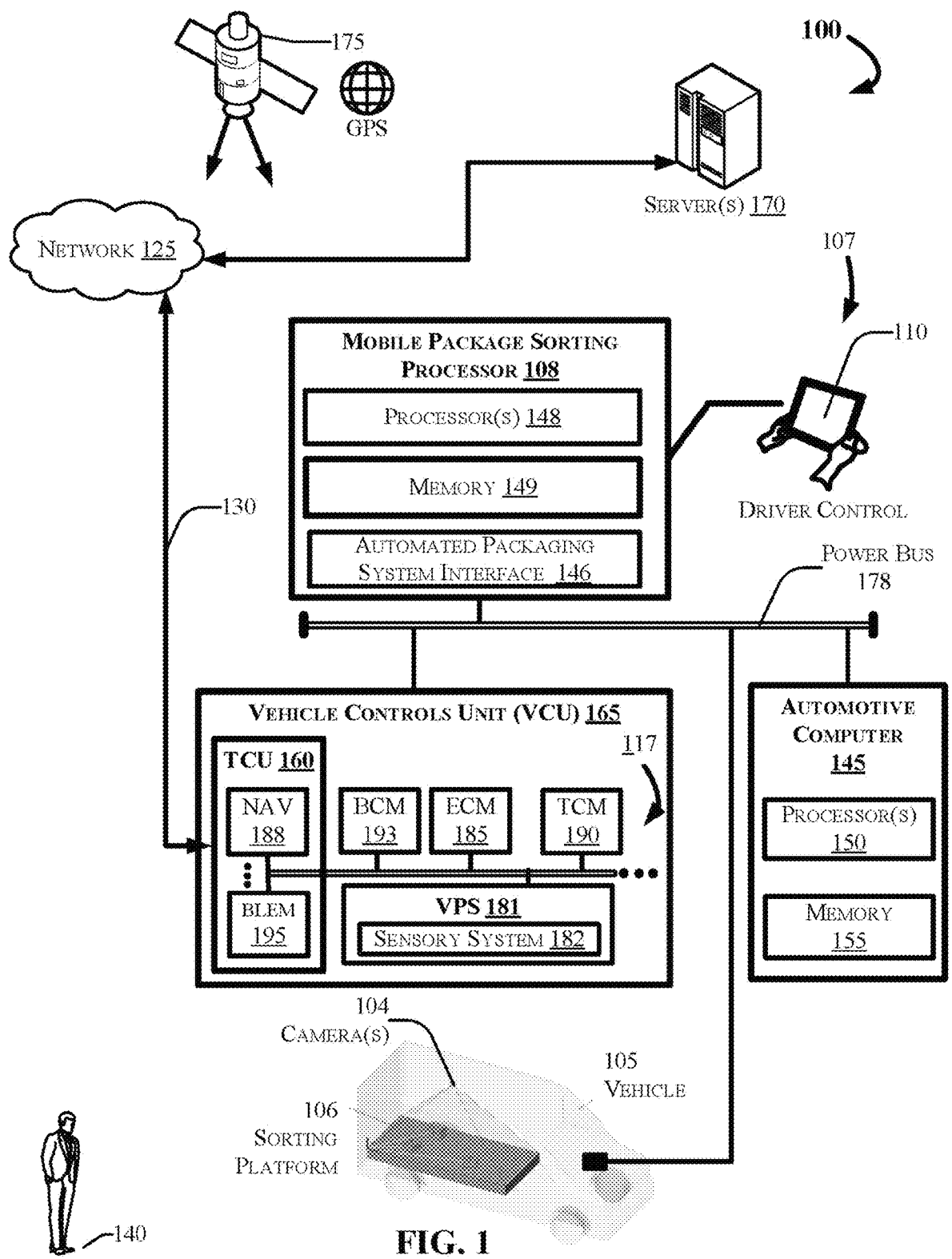
FIG. 1 depicts an example computing environment in which techniques and structures for providing the systems and methods disclosed herein may be implemented.

Disclosed is an improved mobile package sorting platform sensory system used in delivery vehicles. The mobile package sorting platform sensory system uses computer vision and machine learning to determine package identification information, determine package position and orientation information, and determine package geometry information.

The system may identify a package in a number of ways. In one embodiment, the sensory system determines a package identity and estimate a pose of the packages using markers (barcodes, QR codes, etc.) on the packages using image sensors such as cameras disposed inside the vehicle to identify the markers. In one aspect, the disclosed system may determine a package identity using the cameras to read existing text on the package labels. An identity may also be determined using RFID tags placed on the packages.

In other aspects, the mobile package sorting platform sensory system may determine a package pose using fiducial markers disposed in known locations on the exterior surfaces of packages. Using computer vision principles to detect package edges and reconstruct 3-dimensional (3-D) geometry, the sensory system may utilize machine learning to identify 3D bounding boxes estimates, or utilize point cloud data. Pose information may be important to allow the system to plan a collision-free path for a package whenever it is stored or organized.

Determining the package pose may also use package geometry information to sort and position packages onboard the cargo hold of a vehicle. The mobile package sorting platform sensory system may determine package geometry in a number of ways. In one aspect, the sensory system may generate a rectangular prism by cross referencing a package identification (ID) with a package tracking database to obtain the dimensions. In other embodiments, the sensory system may generate a rectangular prism by fitting orthogonal planes to fiducial markers on packages. The system may utilize point cloud data to generate a voxel occupancy grid, and/or generate a convex hull from the point cloud data. The sensory system may also utilize the machine learning algorithms to identify 3D bounding box estimates to optimize package orientation and localization onboard the vehicle.

Embodiments of the present disclosure may enable faster delivery vehicle unloading by localizing packages and bringing them to a handoff point in an automated and expedited fashion. The system may reduce strain and injuries associated with climbing in and out of cargo space, bending to pick up packages, and can enable unmanned cargo loading into the delivery vehicle from a conveyor at a warehouse. In other aspects, the system may support unmanned delivery by automatically retrieving packages (e.g., curbside delivery via a mobile robot), and leveraging an onboard sensory system that may enable faster loading by allowing simultaneous loading of multiple packages, in arbitrary poses, and without the need for manual organization onboard the cargo hold of the delivery vehicle. Localizing packages with robustness to wheel slippage and shifting during transit may further enable closed-loop motion control with real-time package pose feedback.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Aspects of the present disclosure may include determining, with a mobile package sorting sensory system disposed onboard a delivery vehicle, a unique identity of packages loaded in a cargo area of the delivery vehicle. Determining a unique identity for a package loaded onboard a delivery vehicle can help a package management system ensure that all intended packages are loaded into the vehicle, and that no erroneous packages have been loaded. Unique package identification may further enable the system to build a database of the packages inside the vehicle, and enable the mobile package sorting sensory system to cross-reference information associated with the loaded packages, such as delivery address and package dimensions. Moreover, uniquely identifying packages may further enable the system to track a package throughout the delivery process, and enable the system to retrieve a specific package from the vehicle on demand or during a pre-scheduled delivery schedule.

FIG. 1 depicts an example computing environment 100 that can include a vehicle 105, which may be a delivery vehicle according to one or more embodiments of the present disclosure. The vehicle 105 may include an automotive computer 145, a mobile package sorting processor 108, and a Vehicle Controls Unit (VCU) 165 that can include a plurality of electronic control units (ECUs) 117 disposed in communication with the automotive computer 145 and the mobile package sorting processor 108.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as delivery vehicle, the vehicle 105 may take the form of another passenger or commercial automobile such as, for example, a car, a truck, a utility vehicle, a crossover vehicle, a van, a minivan, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the mobile package sorting sensory system 107 may be configured and/or programmed to operate with a vehicle having a Level-1 through Level-4 autonomous vehicle controller. Accordingly, the mobile package sorting sensory system 107 may provide some aspects of human control to the vehicle 105, when the vehicle is configured as an AV.

In some aspects, a Telematics Control Unit (TCU) 160 may connect to one or more server(s) 170 via a wireless network 125 using a wireless transmitter (not shown in FIG. 1) associated with the TCU 160 on the vehicle 105. The wireless connection(s) 130 are depicted in FIG. 1 as communicating via the one or more network(s) 125, and may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the mobile package sorting sensory system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a mobile package sorting sensory program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 180 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets stored in computer memory 155 of the automotive computer 145, including instructions operational as part of the mobile package sorting sensory system 107.

The mobile package sorting processor 10 may include one or more processor(s) 148, a memory 149 and an automated packaging system interface 146. The mobile package sorting processor 108 may connect with a driver control interface 110 that may be used by the user 140 for controlling, viewing, and receiving status updates associated with a package sorting platform 106 disposed in a cargo bay of the vehicle 105. For example, one or more cameras 104, which may be part of and/or communicate with the VPS 181 may provide image data associated with packages managed in the vehicle 105.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the mobile package sorting sensory system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the mobile package sorting sensory system 107, and/or via wireless signal inputs received via the wireless connection(s) from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, VCU 165, and/or the mobile package sorting processor 108 for the mobile package sorting sensory system 107 may omit certain computing modules. It should be readily understood that the computing environment depicted in FIG. 1 is an example of a possible implementation according to the present disclosure, and thus, it should not be considered limiting or exclusive.

Figure 2A:
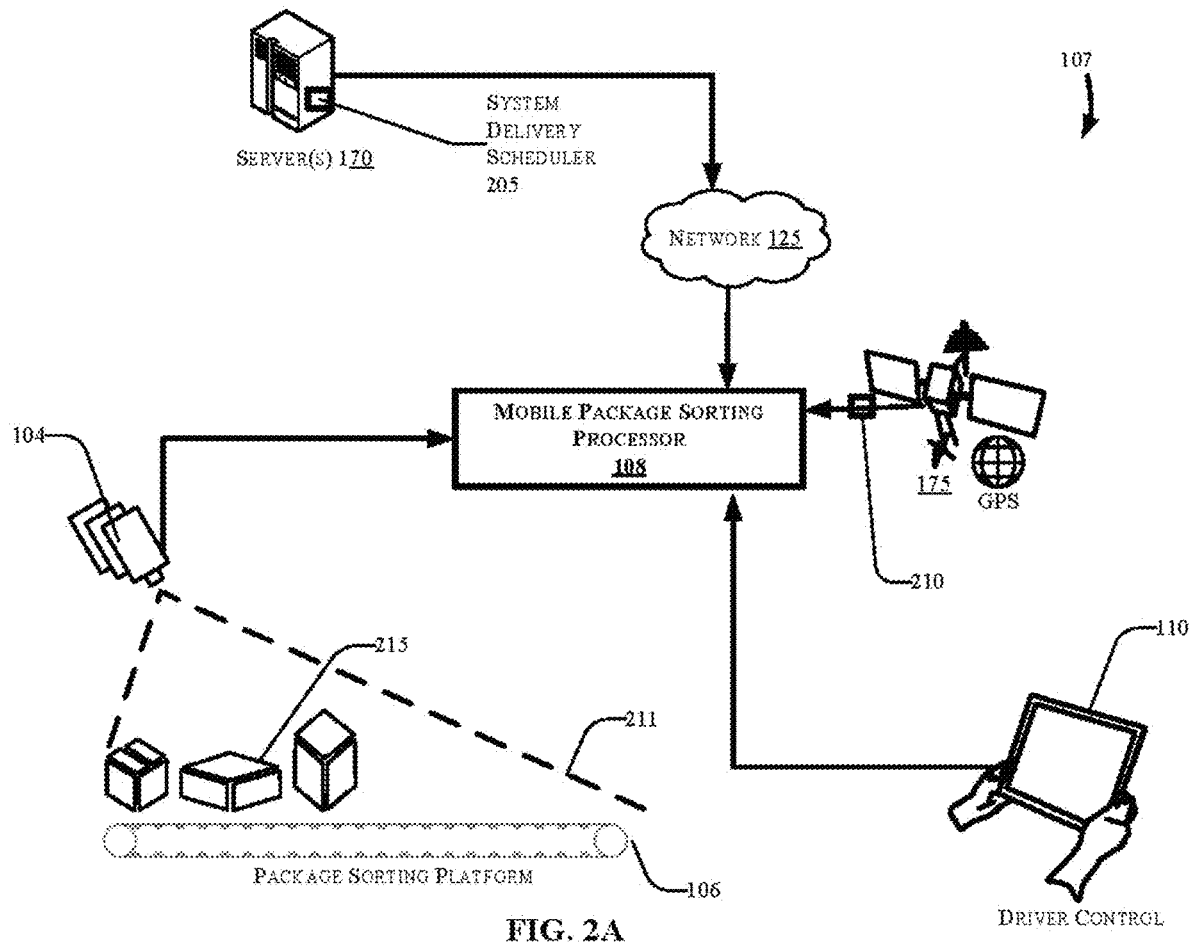
FIG. 2A illustrates a mobile package sorting sensory system in accordance with the present disclosure.

FIG. 2 illustrates the mobile package sorting sensory system 107, in accordance with the present disclosure. The mobile package sorting sensory system 107 may include the server(s) 170 disposed in communication with the mobile package sorting processor 108, and one or more cameras 104. The mobile package sorting processor 108 may receive GPS coordinates 210 from the GPS 175 directly or via the TCU 160 (as shown in FIG. 1). The mobile package sorting processor 108 may connect with one or more cameras 104 disposed onboard the vehicle 105 (as shown in FIG. 1) in an interior portion of the vehicle cargo hold such that the camera(s) 104 may have one or more views 211 of the packages 215 loaded onboard the vehicle 105.

The servers 170 may include a system delivery scheduler 205 that may be configured and/or programmed to handle delivery scheduling for the vehicle 105. For example, the system delivery scheduler 205 may determine optimal routes and delivery order for packages 215 loaded onboard the vehicle 105, which may be used by the mobile package sorting processor 108 to determine optimal poses for respective packages 215.

The system delivery scheduler 205 may further include and/or control a package identity (ID) database (not shown in FIG. 2) having unique identification information for each package (e.g., a plurality of packages 215 as shown in FIG. 2) loaded onboard the vehicle 105, which may inform the mobile package sorting processor 108 of a logical position for the package pose onboard the vehicle 105. For example, a package first in line for delivery according to a delivery schedule determined by the system delivery scheduler 205 may be positioned by the mobile package sorting sensory system 107 to be closest to a point of regress for the cargo hold. Packages that are scheduled at later positions in the delivery route may be positioned, respectively, at positions further away of the cargo hold door.

The camera(s) 104 may include one or more sensory systems such as a red-green-blue (RGB) camera, infrared camera, black and white (monochrome) camera, LiDAR, structured light sensory devices, stereo cameras, camera feature point devices, or other camera known for machine vision package identification. Although shown in a downward and diagonal-pointed position, it should be appreciated that the interior positioning of the camera(s) 104 may be directly perpendicular to the package sorting platform 106, and at various angle(s) from the ceiling and walls (not shown in FIG. 2) of the vehicle 105 cargo hold interior. One or more lighting units (not shown) may be disposed in the cargo area of the vehicle 105 to provide optimal and multi-angled lighting for package viewing by the mobile package sorting sensory system 107.

The driver control interface 110 may be and/or include a handheld mobile device such as a tablet, mobile, or other similar device configured and/or programmed to provide information associated with loading, arranging, delivery including a user interface (not shown) that may provide a delivery schedule, package identification and localization onboard the vehicle 105, and other information.

In one aspect, a package loading process may include receiving the packages 215 on the package sorting platform 106. The mobile package sorting sensory system 107 may receive the packages 215 manually or via a conveyor (not shown in FIG. 2). The mobile package sorting sensory system 107 may determine package IDs as the packages 215 are loaded onboard the vehicle 105 (e.g., loaded onto the package sorting platform 106), and generate or update the database of packages. The database may be disposed in the memory 149 of the mobile package sorting processor 108, and/or stored in the server(s) 170. The mobile package sorting sensory system 107 may optimize a route and sort the packages 215 after loading in an automated fashion by organizing the packages 215 according to delivery route.

For example, it may be advantageous to determine a unique identity for each respective package of the group of packages 215, to ensure all necessary packages are loaded onto the vehicle 105, and to ensure that no erroneous packages have been loaded onboard the vehicle 105. The mobile package sorting sensory system 107 may build the database associated with the system delivery scheduler 205, and/or update the database with the packages 215 loaded onboard the vehicle 105 in real-time as the packages 215 are loaded on the package sorting platform 106. The mobile package sorting sensory system 107 may cross-reference information associated with each package of the plurality of packages 215, including package identity having information associated with weight, delivery address, sending party address, contents of the package, etc. In other aspects, the database may include an association or cross-referenced information that associates a particular package with a unique fiducial marker (illustrated with respect to FIG. 3) disposed on one or more surfaces of the packages 215. The unique ID for each package may further allow the mobile package sorting sensory system 107 to track localization of each respective package 215 throughout the delivery process (e.g., from loading, sorting, repositioning onboard the vehicle 105, and finally delivery). In other aspects, in some instances where the system may be set to redirect a package while en route to a destination, unique package IDs may allow the mobile package sorting sensory system 107 to retrieve a particular package from the vehicle without a labor-intense search by the user 140.

In general, the mobile package sorting sensory system 107 may load the packages 215 onboard the vehicle, and sort the packages 215 on the platform according to the unique IDs and other information based in part on the fiducial marker(s) disposed on multiple surfaces of the packages 215.

A first step for the sorting process can include identifying a respective package using the fiducial marker(s). Examples of fiducial markers are depicted in FIG. 2B.

Figure 2B:
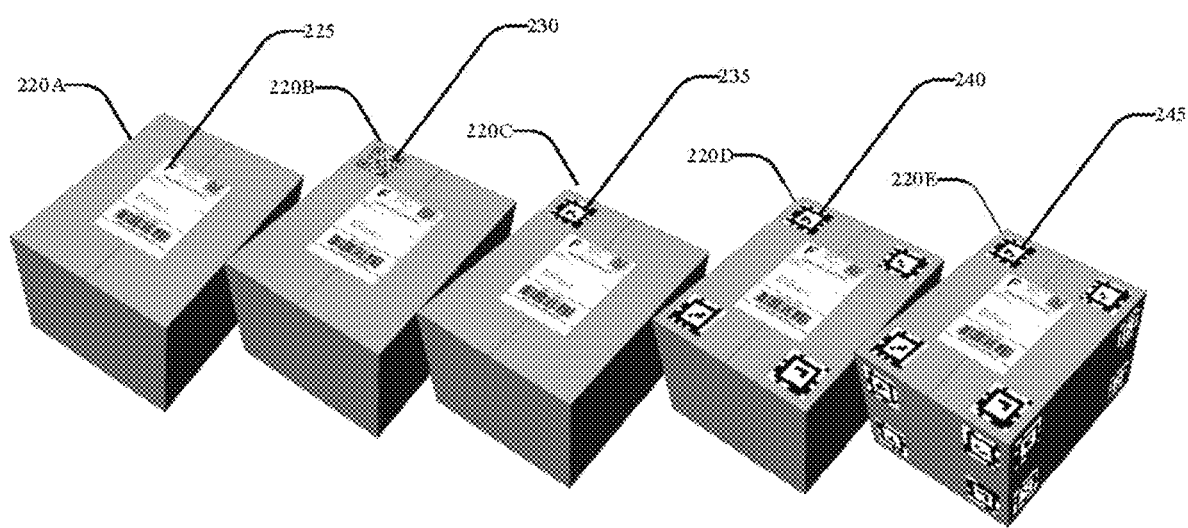
FIG. 2B illustrates example packages with fiducial markers in accordance with the present disclosure.

As shown in FIG. 2B, a package 220 may often arrive at a distribution point having an existing label 225. The package 220 may be, for example, one or more of the packages 215 depicted with respect to FIG. 2A. The package 220 is shown in FIG. 2B in various labeling configurations (220A, 220B, 220C, and 220D, or collectively, 200). One or more fiducial markers may be positioned at various points of the package 220 including, for example, a QR code 230 as shown on package 220B, an AprilTag 235 as shown on package 220C, a plurality of AprilTags disposed on a single surface of the package 220D, and/or a plurality of AprilTags 245 disposed on multiple surfaces of the package 220E. In one example embodiment, having a plurality of AprilTags 245 disposed on the multiple surfaces as shown on package 220E may provide a high level of flexibility and robustness for the functionality of the mobile package sorting sensory system 107, because the package 220 may be oriented with any face of the package pointing up such that the camera(s) 104 may have a clear view of at least one AprilTag without regard to package orientation.

The fiducial markers 230, 235, 240, and 245 may be 1-dimensional (1D) or 2-dimensional (2D) encoded tags that may be adhered to the surface(s) of the package(s) 220, where a vision system disposed as part of the mobile package sorting sensory system 107 may decode the symbols to identify the package(s) 220, and determine a package geometry respective to each of the loaded packages 220.

Figure 3:
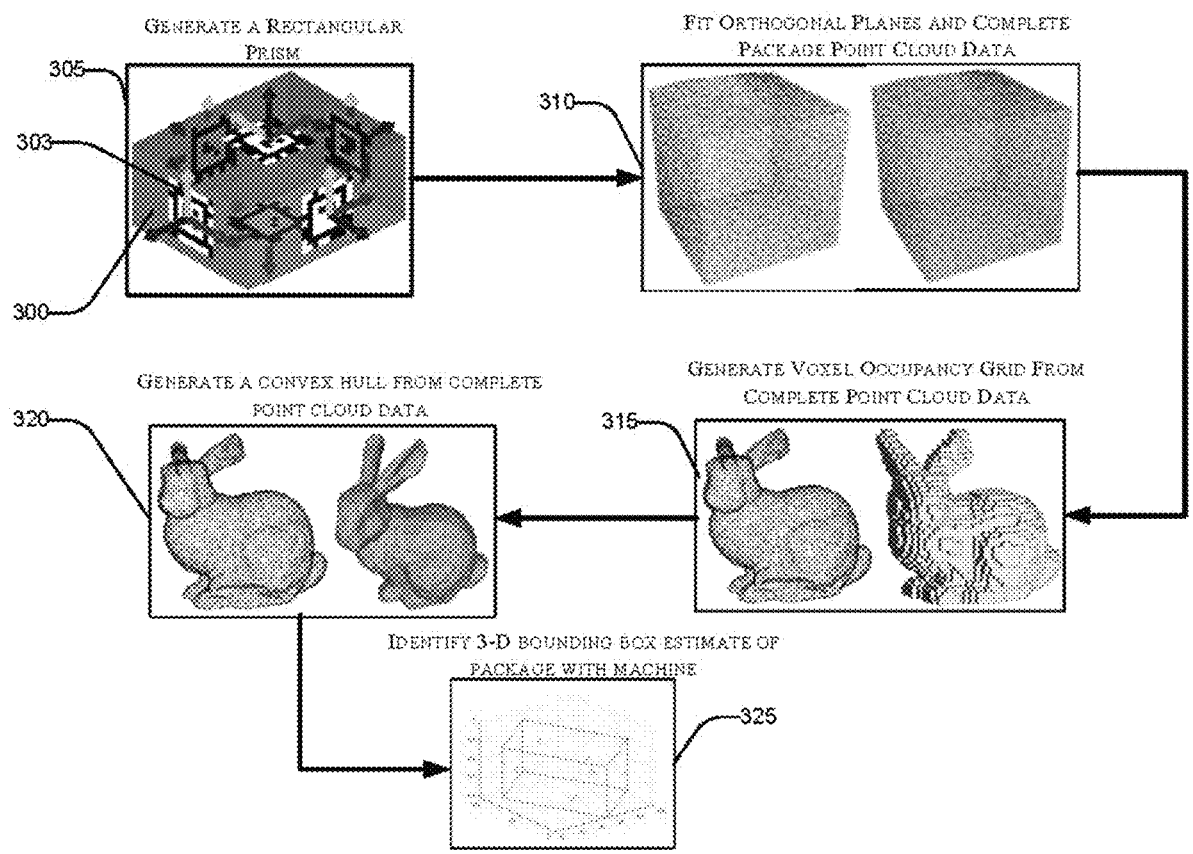
FIG. 3 depicts an example flow diagram for determining a package geometry in accordance with the present disclosure.

FIG. 3 depicts an example flow diagram for determining package geometry for a package 300 using one or more fiducial markers 303, in accordance with the present disclosure. Determining the package geometry may include determining dimensional information associated with the package 300 such as length, width, height, estimated volume, and based in package ID information, package weight.

At step 305, determining the package geometry may commence with generating a rectangular prism by cross referencing package ID with the package tracking database to obtain package dimensions. For example, package dimensions, which may routinely be included with package logistics information stored on the database, may be matched with identified package surfaces identified by the vision system camera(s) 104 and mobile package sorting processor 108.

At step 310, the mobile package sorting sensory system 107 may fit orthogonal planes and complete package point cloud data. More particularly, the mobile package sorting sensory system 107 may identify the package geometry by generating the rectangular prism by fitting orthogonal planes to the fiducial markers 303 (e.g., AprilTags) on the packages 215.

At step 315, the mobile package sorting sensory system 107 may generate a rectangular prism by fitting orthogonal planes to complete package point cloud data.

At step 320, the mobile package sorting sensory system 107 may generate a convex hull from complete point cloud data.

At step 325, the mobile package sorting sensory system 107 may use machine learning to identify a 3-D bounding box estimate of packages. The mobile package sorting sensory system 107 processor may utilize one or more known object recognition methods to determine if the object is a box. For example, the paper Box-Scan: An efficient and effective algorithm for box dimension measurement in conveyor systems using a single RGB-D camera by Ho-min Park et al. (Proceedings of the 7th IIAE International Conference on Industrial Application Engineering 2019, which is incorporated herein by reference) describes methods used for performing a 3-D bounding box estimate of a package. In one aspect, the system 107 may be use d to train a neural network using a training data set comprising images of target objects with ground truth 3D bounding box data (labels) for each target object. One way of establishing the ground truth data is to physically set up a scene where the system 107 first calibrates the camera(s) 104 to reference points (not shown in FIG. 3) in the scene using common camera calibration methods. The system 107 may physically measure the pose of each object relative to those reference points, as well as their bounding box dimensions (e.g., length, width, and height).

An alternative to that approach is using a photorealistic simulator to generate images of a simulated scene. One advantage of the simulation approach is that you already know the simulated camera's intrinsic properties (what you would normally obtain through a camera calibration process), and you know where each target object is in the simulated scene, as well as its bounding box dimensions. The system 107 may determine that an object is a box and track the movement responsive to a positive determination. Responsive to losing the package tracking in real time (e.g., the package shifts out of camera view), the system 107 may re-identify the object through recognizing the unique IDs associated with the package, such as by utilizing information associated with the shipping label. This step may be performed using natural language processing or other known methods.

The photorealistic simulator approach may be advantageous because a large majority of shipped packages are box shaped and box dimensions are included in the shipping manifest, the mobile package sorting sensory system 107 may generate a 3D model of a box with the recorded dimensions. The system 107 may apply machine learning to utilize this 3D model as training material to detect the actual box. Alternatively, the camera 104 can capture images from which the system 107 may measure box dimensions to reference the shipping record or measurements taken previously.

After determining package geometry, the mobile package sorting sensory system 107 may determine, based on the fiducial marker 303, a package pose that can include package position and package orientation with respect to the package sorting platform 106. Determining the package pose may enable the mobile package sorting sensory system 107 to locate the package(s) 215 when storing, reorganizing, or retrieving the packages 215. For example, a plurality of packages 215A, 215B, and 215C may be loaded onboard the vehicle (not shown in FIG. 4) on a top conveying surface of the package sorting platform 106. The package sorting platform 106 may include a plurality of omni-directional conveyor mechanisms 405 that may move the packages 215 in any lateral direction. The pose determination step may enable the mobile package sorting sensory system 107 to plan a collision-free path to a new package storage destination in the cargo hold of the vehicle 105 whenever storing, reorganizing, or retrieving the packages 215. In other aspects, pose estimation may enable the mobile package sorting sensory system 107 to overcome cumulative positioning error due to wheel slippage and shifting during transit.

Figure 4:
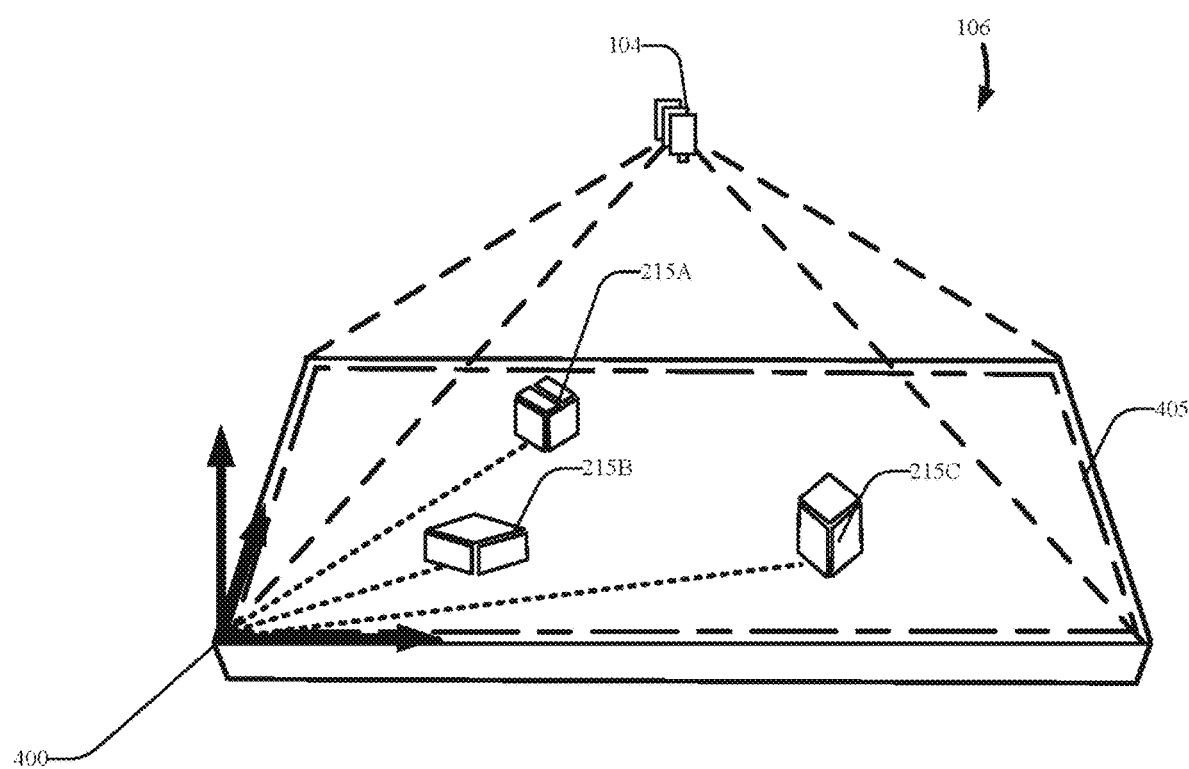
FIG. 4 depicts an example of determining a package pose in accordance with the present disclosure.

FIG. 4 depicts an example of determining a package pose for one or more packages 215 using the package sorting platform 106, in accordance with the present disclosure. In one aspect, the camera(s) 104 may determine a pose of the packages 215 A-215C with respect to a set origin 400 of the package sorting platform 106. The fiducial marker(s) 303 may provide real-time data specific to each respective package 215 that allow the computer vision system associated with the mobile package sorting sensory system 107 to estimate the package pose. The mobile package sorting sensory system 107 may determine package pose using edge detection, by utilizing 3-D bounding boxes, by using the fiducial tags to determine relative transformation between the camera(s) 104 and the object(s) being tracked (e.g., the packages 215). The mobile package sorting sensory system 107 may determine where in 3-D space the package is respective to the camera(s) 104.

For example, the pose determination may further enable the mobile package sorting sensory system 107 to control the motion of packages more precisely by providing real-time pose feedback for closed-loop motion control onboard the delivery vehicle while en route to a delivery destination. This may also enable the system to compensate for gross disturbances such as collisions between packages, which may damage extremely fragile cargo. For example, the omni-directional conveyor mechanisms 405 may orient the packages by sorting the packages in a delivery order position with respect to the first package planned to be delivered on a delivery route.

Figure 5:
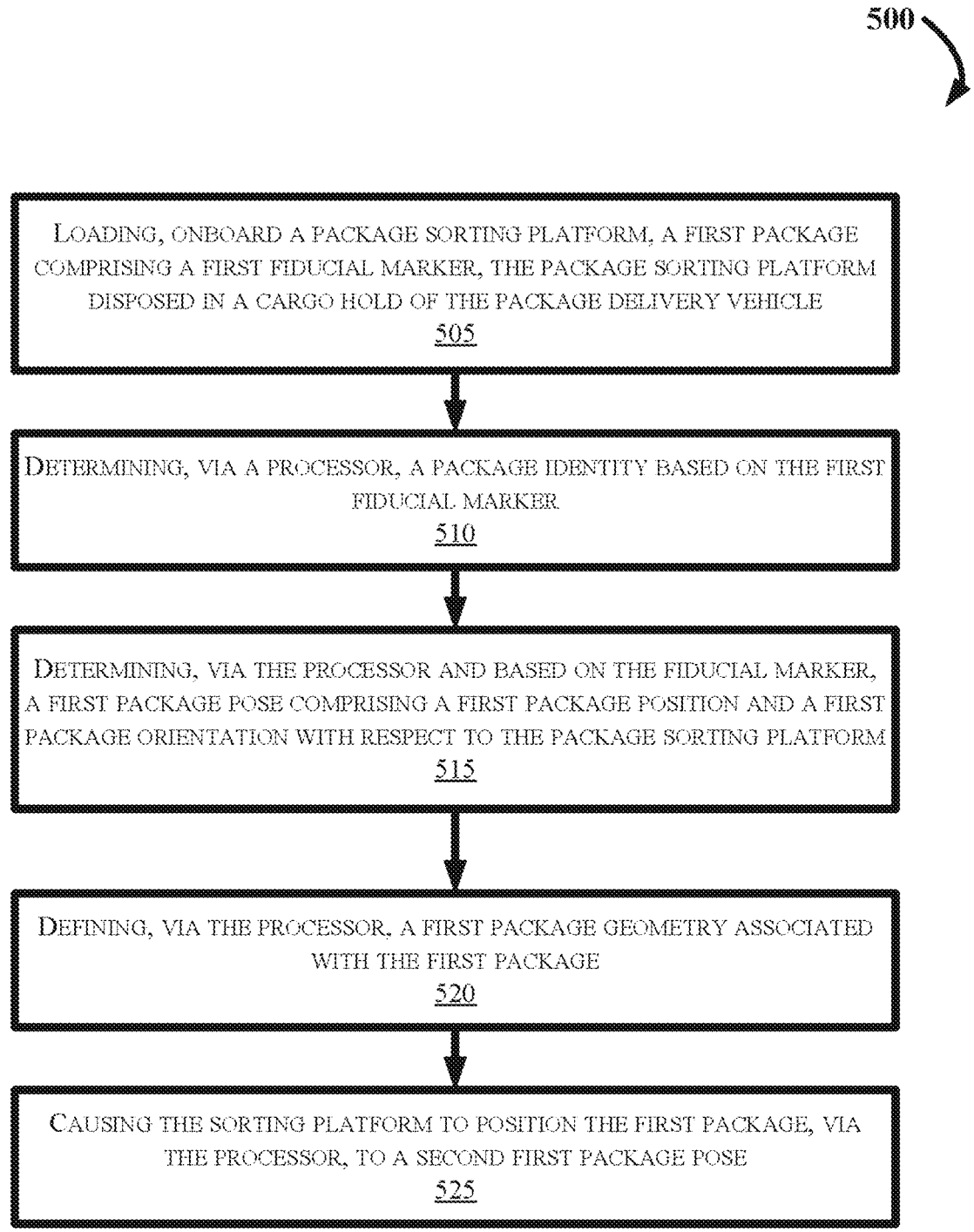
FIG. 5 depicts a flow diagram of an example method for mobile package sorting using a package sorting sensory system in accordance with the present disclosure.

FIG. 5 is a flow diagram of an example method 500 for controlling a package delivery management system, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with loading, onboard a package sorting platform, a first package comprising a first fiducial marker, the package sorting platform disposed in a cargo hold of the package delivery vehicle.

At step 510, the method 500 may further include determining, via a processor, a package identity based on the first fiducial marker. This step may include cross referencing the first package ID with a tracking database and obtaining a set of first package dimensions.

At step 515, the method 500 may further include determining, via the processor and based on the fiducial marker, a first package pose comprising a first package position and a first package orientation with respect to the package sorting platform. This step may include determining, via a processor and based on the fiducial marker, that the second fir package pose has changed while the delivery vehicle is en route to a delivery destination, and causing the sorting platform to reposition the first package to a third first package pose.

At step 520, the method 500 may further include defining, via the processor, a first package geometry associated with the first package. This step may include determining a package identification (ID) and generating a plurality of rectangular prisms based on the package ID. The system may include the steps of cross referencing the first package ID with a tracking database and obtaining a set of first package dimensions, fitting a first orthogonal plane to the first fiducial marker, generating a point cloud data set associated with the first package, and generating a rectangular prism by fitting a second orthogonal plane to the point cloud data set. In other aspects, defining the package geometry may further include generating a voxel occupancy grid from a point cloud data set associated with the first package, generating a convex hull from the point cloud data set, and identifying a 3-dimensional (3-D) bounding box estimate associated with the first package. Estimating the 3-D bounding box associated with the first package may be performed using a trained machine learning algorithm.

At step 525, the method 500 may further include causing the sorting platform to position the first package, via the processor, to a second first package pose. This step may include moving the package to a position onboard the delivery vehicle that positions the package closer to a point of regress such that the package is accessible at a time and geographic position for delivery. This step may further include loading a second package onboard the package sorting platform, determining a second package identity based on a second fiducial marker disposed on a surface of the second package, determining a second package identity based on the second fiducial marker, determining a second package pose, defining a second package geometry associated with the second package, and causing the sorting platform to position the second package in a delivery order position with respect to the first package. The delivery order position for the second package may be associated with a planned delivery route and relative order of package delivery.

Embodiments of the present disclosure may enable faster vehicle unloading by finding packages and quickly bringing them to a handoff point. The system may reduce strain and injuries associated with climbing in and out of cargo space and bending to pick up packages, and enable unmanned loading into the vehicle (e.g., loading directly from a conveyor at a warehouse). In other aspects, the system may support unmanned delivery by automatically retrieving packages (e.g., curbside delivery via a mobile robot), and leveraging an onboard sensing subsystem that may enable faster loading by allowing multiple packages to be loaded at once, in arbitrary poses, and without the need for manual organization. The sensing system may localize packages with robustness to wheel slippage and shifting during transit, and further enable closed-loop motion control by providing real-time pose feedback.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a package delivery vehicle, comprising:
    loading, onboard a package sorting platform, a first package comprising a first fiducial marker, the package sorting platform disposed in a cargo hold of the package delivery vehicle;
    determining, via a processor, a package identity based on the first fiducial marker;
    determining, via the processor and based on the first fiducial marker, a first package pose comprising a first package position and a first package orientation with respect to the package sorting platform;
    defining, via the processor, a first package geometry associated with the first package by determining a first package identification (ID) and generating a plurality of rectangular prisms based on the first package ID, wherein defining the plurality of rectangular prisms comprises:
        cross referencing the first package ID with a tracking database and obtaining a set of first package dimensions;
        fitting a first orthogonal plane to the first fiducial marker;
        generating a point cloud data set associated with the first package; and
        generating a rectangular prism by fitting a second orthogonal plane to the point cloud data set; and
    causing the package sorting platform to position the first package, via the processor, to a second first package pose.

2. The method according to claim 1, further comprising loading a second package, the method further comprising:
    loading the second package onboard the package sorting platform;
    determining a second package identity based on a second fiducial marker disposed on a surface of the second package;
    determining a second package pose;
    defining a second package geometry associated with the second package; and
    causing the package sorting platform to position the second package in a delivery order position with respect to the first package, wherein the delivery order position is associated with a planned delivery route and relative order of package delivery.

3. The method according to claim 1 further comprising,
    generating a voxel occupancy grid from the point cloud data set associated with the first package;
    generating a convex hull from the point cloud data set; and
    identifying a 3-dimensional (3-D) bounding box estimate associated with the first package.

4. The method according to claim 3, wherein identifying the 3-D bounding box estimate comprises:
    estimating the 3-D bounding box associated with the first package using a trained machine learning algorithm.

5. The method according to claim 1, wherein the first fiducial marker comprises an AprilTag.

6. The method according to claim 1, wherein the first fiducial marker comprises one or more of an RFID tag, a barcode and a QR code.

7. The method according to claim 1, wherein causing the package sorting platform to position the first package to the second first package pose further comprises:
   determining, via the processor and based on the first fiducial marker, that the second first package pose has changed while the package delivery vehicle is en route to a delivery destination; and
   causing the package sorting platform to reposition the first package to a third first package pose.

8. A system, comprising:
   a processor; and
   a memory for storing executable instructions, the processor programmed to execute the instructions to:
   load, onboard a package sorting platform, a first package comprising a first fiducial marker, the package sorting platform disposed in a cargo hold of a package delivery vehicle;
   determine a package identity based on the first fiducial marker;
   determine, based on the first fiducial marker, a first package pose comprising a first package position and a first package orientation with respect to the package sorting platform;
   define a first package geometry associated with the first package by determining a first package identification (ID) and generating a plurality of rectangular prisms based on the first package ID, wherein defining the plurality of rectangular prisms comprises:
      cross referencing the first package ID with a tracking database and obtaining a set of first package dimensions;
      fitting a first orthogonal plane to the first fiducial marker;
      generating a point cloud data set associated with the first package; and
      generating a rectangular prism by fitting a second orthogonal plane to the point cloud data set; and
   cause the package sorting platform to position the first package to a second first package pose.

9. The system according to claim 8, wherein the processor is further programmed to load a second package by executing the instructions to:
   load the second package onboard the package sorting platform;
   determine a second package identity based on a second fiducial marker disposed on a surface of the second package;
   determining a second package pose;
   define a second package geometry associated with the second package; and
   cause the package sorting platform to position the second package in a delivery order position with respect to the first package, wherein the delivery order position is associated with a planned delivery route and relative order of package delivery.

10. The system according to claim 8, wherein the processor is further programmed to:
   generate a voxel occupancy grid from the point cloud data set associated with the first package;
   generate a convex hull from the point cloud data set; and
   identify a 3-dimensional (3-D) bounding box estimate associated with the first package.

11. The system according to claim 10, wherein the processor is further programmed to identify the 3-D bounding box estimate by executing the instructions to:
   estimating the 3-D bounding box associated with the first package using a trained machine learning algorithm.

12. The system according to claim 10, wherein the processor is further programmed to causing the package sorting platform to position the first package to the second first package pose by further executing the instructions to:
   determine, via the processor and based on the first fiducial marker, that the second first package pose has changed while the package delivery vehicle is en route to a delivery destination; and
   cause the package sorting platform to reposition the first package to a third first package pose.

13. The system according to claim 8, wherein the first fiducial marker comprises one or more of an RFID tag, a barcode and a QR code.

14. A non-transitory computer-readable storage medium in a mobile package sorting sensory system, the computer-readable storage medium having instructions stored thereupon which, when executed by a processor, cause the processor to:
   load, onboard a package sorting platform, a first package comprising a first fiducial marker, the package sorting platform disposed in a cargo hold of a package delivery vehicle;
   determine a package identity based on the first fiducial marker;
   determine, based on the first fiducial marker, a first package pose comprising a first package position and a first package orientation with respect to the package sorting platform;
   define a first package geometry associated with the first package by determining a first package identification (ID) and generating a plurality of rectangular prisms based on the first package ID, wherein defining the plurality of rectangular prisms comprises:
      cross referencing the first package ID with a tracking database and obtaining a set of first package dimensions;
      fitting a first orthogonal plane to the first fiducial marker;
      generating a point cloud data set associated with the first package; and
      generating a rectangular prism by fitting a second orthogonal plane to the point cloud data set; and
   cause the package sorting platform to position the first package to a second first package pose.

15. The non-transitory computer-readable storage medium in the mobile package sorting sensory system of claim 14, further comprising causing the processor to:
   load a second package onboard the package sorting platform;
   determine a second package identity based on a second fiducial marker disposed on a surface of the second package;
   determine a second package pose;
   define a second package geometry associated with the second package; and
   cause the package sorting platform to position the second package in a delivery order position with respect to the first package, wherein the delivery order position is associated with a planned delivery route and relative order of package delivery.

* * * * *